No. 633,211. J. J. McDONALD. Patented Sept. 19, 1899.
CORN HUSKER.
(Application filed Mar. 21, 1898.)
(No Model.)
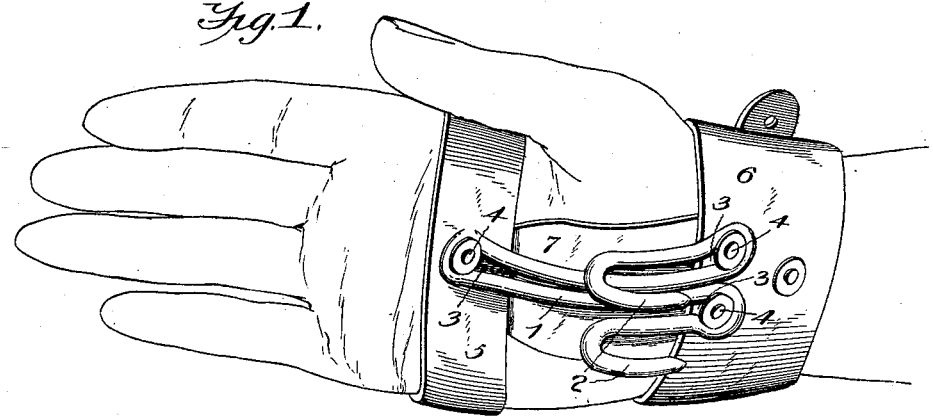
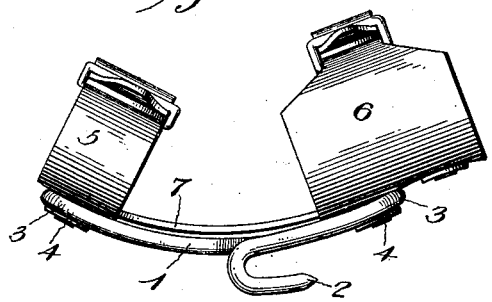
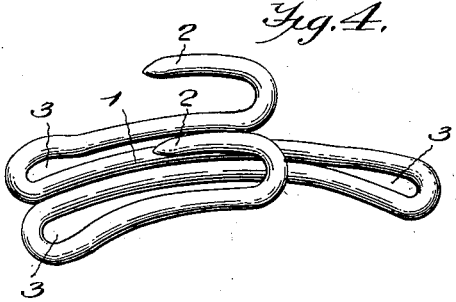
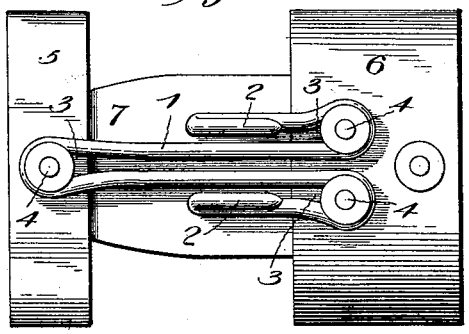
Witnesses
J. Knauff Culverwell,
V. B. Hillyard.
John J. McDonald,
Inventor
By his Attorneys,
C. A. Snow & Co.

UNITED STATES PATENT OFFICE.

JOHN J. McDONALD, OF CRAB ORCHARD, NEBRASKA.

CORN-HUSKER.

SPECIFICATION forming part of Letters Patent No. 633,211, dated September 19, 1899.

Application filed March 21, 1898. Serial No. 674,675. (No model.)

*To all whom it may concern:*

Be it known that I, JOHN J. MCDONALD, a citizen of the United States, residing at Crab Orchard, in the county of Johnson and State of Nebraska, have invented a new and useful Corn-Husker, of which the following is a specification.

This invention relates to that class of implements which are applied to the hand for facilitating the stripping of husks from ears of corn, and has for its object to provide an implement of this character which can be cheaply constructed and will be reliable and effective for the work designed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a detail view showing the husking implement as it will appear when applied to the hand. Fig. 2 is a side view thereof. Fig. 3 is a front view. Fig. 4 is a detail view in perspective of the husking device disassociated from the attaching-straps.

Corresponding and like parts are referred to in the following description and indicated in all the views of the drawings by the same reference characters.

The husking device proper irrespective of the attaching-straps consists of a body or shank 1 and side hooks 2, the body or shank curving longitudinally, so as to conform to the outline of the base portion of the hand to fit the same snugly, and the side hooks 2 are about half the length of the body or shank, so as to come about opposite the base of the hand, as indicated in Fig. 1 of the drawings. The device is constructed of a length of wire which is doubled upon itself and has its end portions recurved and extending parallel with the body or shank 1 and then bent into hook form, as shown, the terminals being pointed, so as to readily penetrate the husks when the device is in operation. The members of the body or shank 1 and the shank or body portions of the hooks 2 extend parallel, and the folded ends are spread sufficiently to provide eyes 3, through which rivets 4 pass for securing the device to the attaching-straps.

The hand-strap 5 is secured to the outer end of the body or shank 1, and the wrist-strap 6 is made fast to the inner end of the said body or shank by rivets 4 passing through the eyes formed between the members of the shank 1 and the contiguous portions of the hooks 2. A piece of leather 7 or other stout material is placed against the inner or rear side of the device and is secured at its ends to the hand and wrist straps preferably by means of the same rivets or fastenings 4, and this part 7 constitutes a protector for the base portion of the hand and thumb and prevents injury thereto.

The implement is attached about as shown in Fig. 1 of the accompanying drawings, the strap 5 encircling the hand at a point about midway of the palm and the strap 6 encompassing the wrist. The body or shank 1 of the metal device by reason of its curvature conforms to the base portion of the hand and fits around the same snugly, and the side hooks 2 come opposite the base of the hand and project, so as to readily enter the husks of an ear of corn held in the opposite hand. The shanks of the hooks 2 by being arranged at opposite sides of the inner portion of the shank or body 1 increase the width of the device at that point to enable it to withstand the force of the blows incident to husking corn and also to distribute the same over a comparatively large area to lessen the effect of the blows on the hand of the operator. This arrangement also provides a broad bearing for the hooks and prevents them from turning on the straps or bands. The ears of corn are divested of their husks by grasping them in the left hand and passing the points of the hooks 2 through the husks at one end of the ear. A deft movement of the hand having the implement applied thereto by passing it lengthwise over the ear of corn will part the husks and expose the ear and enable the separated portions of the husks to be pushed aside and the ear removed, the operation being completed by snapping the end portion of the stalk from the cob in the usual manner.

Having thus described the invention, what is claimed, and desired to be secured by Letters Patent, is—

1. A corn-husking implement comprising the shank or body extending longitudinally of the hand of the operator and curved throughout its length to present an inner concave face and an outer convex face and provided with an inwardly-extending hook, said body being constructed of wire and provided with eyes formed by bends of the wire, and straps arranged at right angles to the body, adapted to secure the same to the hand of the user, and provided with fastening devices passing through the said eyes, substantially as described.

2. A corn-husking implement comprising a longitudinal body or shank constructed of wire, a pair of inwardly-extending hooks having shanks arranged at opposite sides of the inner portion of the said shank or body, formed integral with the same and increasing the width of the device at the inner end, and a strap arranged at right angles to the body and adapted to encircle the hand, substantially as described.

3. A device of the class described comprising a shank or body constructed of a single piece of wire doubled upon itself to form two sides and to provide an eye at one end of the body, the ends of the wire being provided with return-bends to form eyes at the other end of the body and extended along the latter and formed into a pair of inwardly-extending hooks, and means for securing the body to a hand, substantially as described.

4. The herein-described corn-husking implement comprising a body or shank curving longitudinally and side hooks formed of a single length of wire doubled upon itself and having its end portions recurved, the folded portion being spaced apart to provide eyes, hand and wrist straps, a protecting-piece placed against the inner or rear side of the husker, and fastenings for connecting the various parts and passing through the eyes formed by folding the wire or blank from which the husker is formed, substantially as set forth.

5. A corn-husking implement comprising a shank or body extending longitudinally of the hand of the operator, and provided at a point between its ends with inwardly-extending hooks located at opposite sides of the shank or body, and the straps or bands arranged at the ends of the shank or body and adapted to secure the same to the hand and to the wrist, substantially as described.

6. A corn-husking implement comprising a shank or body provided at opposite sides with inwardly-extending hooks, said shank or body being disposed longitudinally of the hand of the operator and formed of wire, the bends of the wire forming eyes at the ends of the shank or body, straps located at the terminals of the shank or body for securing the same to the hand and wrist of the operator, and fastening devices passing through the said eyes and connecting the straps to the shank or body, substantially as described.

In testimony that I claim the foregoing as my own I have hereto affixed my signature in the presence of two witnesses.

JNO. J. McDONALD.

Witnesses:
A. LOUITT,
CHARLIE DEULEN.